(12) United States Patent
Maeda et al.

(10) Patent No.: US 12,144,092 B2
(45) Date of Patent: Nov. 12, 2024

(54) MICROWAVE TREATMENT DEVICE

(71) Applicant: Panasonic Intellectual Property Management Co., Ltd., Osaka (JP)

(72) Inventors: Kazuki Maeda, Shiga (JP); Daisuke Hosokawa, Shiga (JP); Yoshiharu Oomori, Shiga (JP); Koji Yoshino, Shiga (JP); Fumitaka Ogasawara, Hyogo (JP); Takashi Uno, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 616 days.

(21) Appl. No.: 17/603,023

(22) PCT Filed: Jul. 28, 2020

(86) PCT No.: PCT/JP2020/028817
§ 371 (c)(1),
(2) Date: Oct. 12, 2021

(87) PCT Pub. No.: WO2021/020375
PCT Pub. Date: Feb. 4, 2021

(65) Prior Publication Data
US 2022/0201813 A1    Jun. 23, 2022

(30) Foreign Application Priority Data
Jul. 31, 2019  (JP) .................. 2019-140414

(51) Int. Cl.
*H05B 6/68* (2006.01)
*H05B 6/64* (2006.01)
*H05B 11/00* (2006.01)

(52) U.S. Cl.
CPC ........... *H05B 6/687* (2013.01); *H05B 6/6447* (2013.01); *H05B 11/00* (2013.01)

(58) Field of Classification Search
CPC ........ H05B 6/68; H05B 6/687; H05B 6/6447; H05B 11/00; H05B 6/705; F24C 7/085
See application file for complete search history.

(56) References Cited

U.S. PATENT DOCUMENTS

2020/0205245 A1* 6/2020 Ma ................... H05B 6/6473
2022/0353960 A1* 11/2022 Hosokawa ......... H05B 6/687

FOREIGN PATENT DOCUMENTS

EP    3324123    5/2018
EP    3327355    5/2018
(Continued)

OTHER PUBLICATIONS

International Search Report of PCT application No. PCT/JP2020/028817 dated Oct. 13, 2020.
(Continued)

*Primary Examiner* — Brian W Jennison
(74) *Attorney, Agent, or Firm* — Wenderoth, Lind & Ponack, L.L.P.

(57) ABSTRACT

A microwave treatment device of the present disclosure includes heating chamber (1) for accommodating object (2) to be heated, microwave generator (3), heater (7), power feeder (4), detector (5), and controller (6). Microwave generator (3) generates microwaves. Heater (7) includes a heat source other than the microwaves and heats an inside of heating chamber (1). Power feeder (4) supplies the heating chamber with the microwaves. Detector (5) detects reflected power from power feeder (4). Controller (6) controls heater (7) and microwave generator (3). When heater (7) carries out heating, Controller (6) causes microwave generator (3) to generate the microwaves in heating by heater (7). The microwaves have output power such that the reflected power at a level detectable by detector (5) returns. By present
(Continued)

disclosure, by understanding progress of cooking, a heating target can be appropriately cooked.

7 Claims, 6 Drawing Sheets

(56) References Cited

FOREIGN PATENT DOCUMENTS

| | | |
|---|---|---|
| JP | 59-037697 | 3/1984 |
| JP | 7-027343 | 1/1995 |
| JP | 11-083325 | 3/1999 |
| JP | 2004-311050 | 11/2004 |
| JP | 2013-092303 | 5/2013 |
| JP | 2020-102440 | 7/2020 |

OTHER PUBLICATIONS

Extended European Search Report dated Aug. 2, 2022 for the related European Patent Application No. 20847613.5.

* cited by examiner

MICROWAVE TREATMENT DEVICE

TECHNICAL FIELD

The present disclosure relates to a microwave treatment device including a microwave generator.

BACKGROUND ART

Conventionally, microwave treatment devices of cooking a heating target by radiation heating using, for example, a tubular heater, and by microwave heating using microwaves have been known (for example, Patent Literature 1). Known conventional technologies include a technology in which an amount of reflected power not absorbed in a heating chamber and returning from the heating chamber is detected so as to understand progress of cooking and to determine an end timing of cooking (for example, Patent Literature 2).

Citation List

Patent Literature

PTL 1: Japanese Patent Application Unexamined Publication No. S59-37697

PTL 1: Japanese Patent Application Unexamined Publication No. H11-83325

SUMMARY OF THE INVENTION

In the above conventional microwave treatment device, cooking with microwaves is carried out almost at the same time as understanding of progress of cooking by detecting reflected power. Microwave heating has an advantage of being able to heat foods to its interior in a short time, but it also has disadvantages such as local concentration of heating and drying of foods due to overheating. When microwaves are used in combination with heat sources such as a tubular heater and convection, overheating by microwave heating may occur depending on the type and amount of a food.

The present disclosure has an object to provide a microwave treatment device capable of understanding progress of cooking by supplying a heating chamber with microwaves at a level that does not affect cooking, and detecting an amount of reflected power returning from the heating chamber, when a food is cooked by using a heating source other than microwaves.

A microwave treatment device of one aspect of the present disclosure includes a heating chamber for accommodating a heating target, a microwave generator, a heater, a power feeder, a detector, and a controller. The microwave generator generates microwaves. The heater includes a heat source other than microwaves, and heats the inside of the heating chamber. The power feeder supplies the heating chamber with microwaves. The detector detects reflected power from the power feeder. The controller controls the heater and the microwave generator.

The controller causes the microwave generator to generate the microwaves having output power such that the reflected power at a level detectable by the detector returns in heating by the heater.

The microwave treatment device of the present disclosure can appropriately cook a heating target by understanding progress of cooking while suppressing an adverse effect by a microwave due to, for example, overheating of a heating target.

DESCRIPTION OF EMBODIMENTS

A microwave treatment device of a first aspect of the present disclosure includes a heating chamber for accommodating a heating target, a microwave generator, a heater, a power feeder, a detector, and a controller. The microwave generator generates microwaves. The heater includes a heat source other than microwaves, and heats the inside of the heating chamber. The power feeder supplies the heating chamber with microwaves. The detector detects reflected power from the power feeder. The controller controls the heater and the microwave generator.

The controller causes the microwave generator to generate the microwaves in heating by the heater, and the microwaves have output power such that the reflected power at a level detectable by the detector returns.

In a microwave treatment device of a second aspect of the present disclosure, based on the first embodiment, the controller causes the microwave generator to set the output power of the microwave to a predetermined output power smaller than the output power of the heater.

In the microwave treatment device of a third aspect of the present disclosure, based on the first or second embodiment, the controller causes the microwave generator to set the output power of the microwaves to be less than 500 W on average per predetermined time.

In the microwave treatment device of a fourth aspect of the present disclosure, based on any one of the first to third embodiments, the controller causes the microwave generator to generate the microwaves successively.

In the microwave treatment device of a fifth aspect of the present disclosure, based on any one of the first to third embodiments, the controller causes the microwave generator to generate the microwaves intermittently.

In the microwave treatment device of a sixth aspect of the present disclosure, based on the fifth embodiment, the controller causes the microwave generator to change a time interval of the microwaves supplied intermittently in accordance with proceeding of cooking.

In the microwave treatment device of a seventh aspect of the present disclosure, based on the second embodiment, the controller causes the microwave generator to provide a time zone in which the output power of the microwave is set to be larger than the predetermined output power.

In the microwave treatment device of an eighth aspect of the present disclosure, based on any one of the first to seventh embodiments, the controller controls the heater based on the reflected power detected by the detector.

Hereinafter, the exemplary embodiments of the present disclosure are described with reference to drawings.

First Exemplary Embodiment

Figure 1:
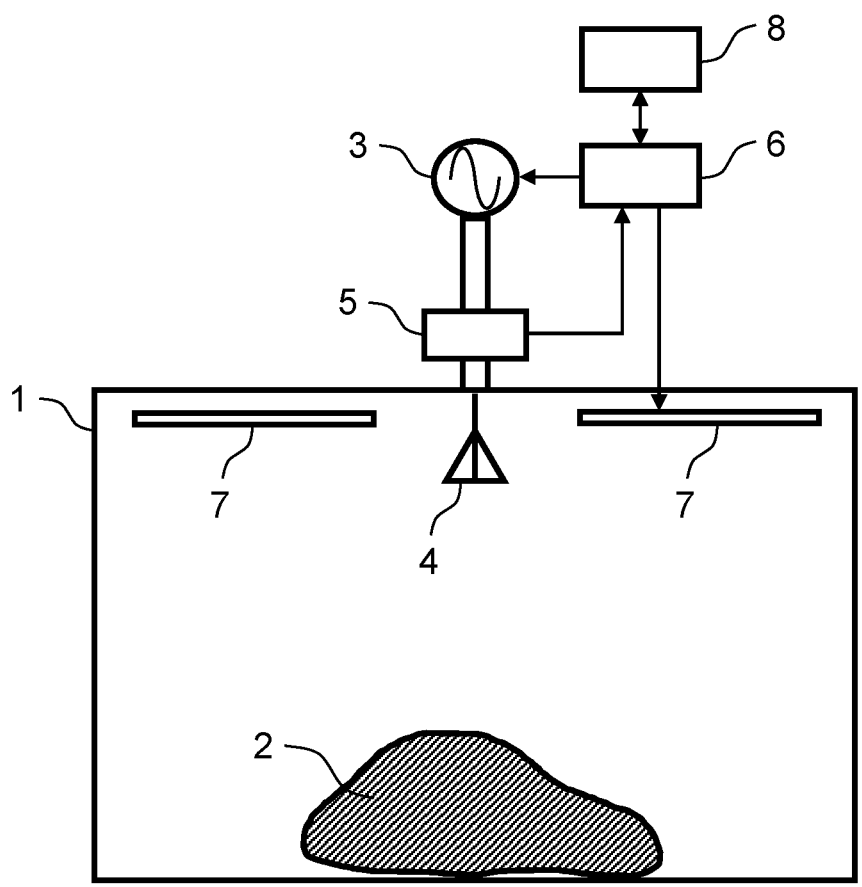
FIG. 1 is a schematic configuration diagram of a microwave treatment device in accordance with a first exemplary embodiment of the present disclosure.

FIG. 1 is a schematic configuration diagram of a microwave treatment device in accordance with a first exemplary embodiment of the present disclosure. As shown in FIG. 1, the microwave treatment device in accordance with this exemplary embodiment includes heating chamber 1, microwave generator 3, power feeder 4, detector 5, controller 6, heater 7, and memory 8.

Heating chamber 1 has metal walls, and accommodates heating target 2 as a load. Heater 7 is a heat source other than microwaves. In this exemplary embodiment, heater 7 is a tubular heater disposed on the ceiling of heating chamber 1 for radiant heating.

Heater 7 may include a convection heater and a circulation fan (not shown) disposed outside heating chamber 1. In this case, heater 7 carries out convection heating in which hot air is circulated in heating chamber 1 by using a tubular heater, a convection heater, and a circulation fan.

Microwave generator 3 includes an oscillator and an amplifier made of semiconductor. Microwave generator 3 generates microwaves having a frequency selected by controller 6 from a predetermined frequency band. Microwave generator 3 amplifies the generated microwaves in accordance with the instruction of controller 6, and outputs microwaves having the desired frequency and output power. The microwaves generated from microwave generator 3 propagates to power feeder 4 through a transmission path such as a coaxial line.

Power feeder 4 includes an antenna, and supplies heating chamber 1 with the microwaves output from microwave generator 3 as incident power. In the incident power, power which is not consumed by heating target 2 and the like becomes reflected power that returns from heating chamber 1 to microwave generator 3 via power feeder 4.

Detector 5 includes, for example, a directional coupler, and detects incident power and reflected power, and notifies controller 6 of an amount of the detected incident power and the reflected power. In other words, detector 5 functions as both an incident power detector and a reflected power detector. Memory 8 includes, for example, a semiconductor memory, stores data from controller 6, reads out and transmits the stored data to controller 6.

Controller 6 includes a microcomputer equipped with a central processing unit (CPU). Controller 6 controls microwave generator 3 and heater 7 based on the information from detector 5 and memory 8, and performs cooking control in the microwave treatment device.

In this exemplary embodiment, heating target 2 is cooked by using only heater 7. Microwaves are not used for heating of heating target 2, but used by controller 6 to understand progress of cooking based on the reflected power detected by detector 5. Controller 6 controls heater 7 in accordance with the progress of cooking.

Figure 2A:
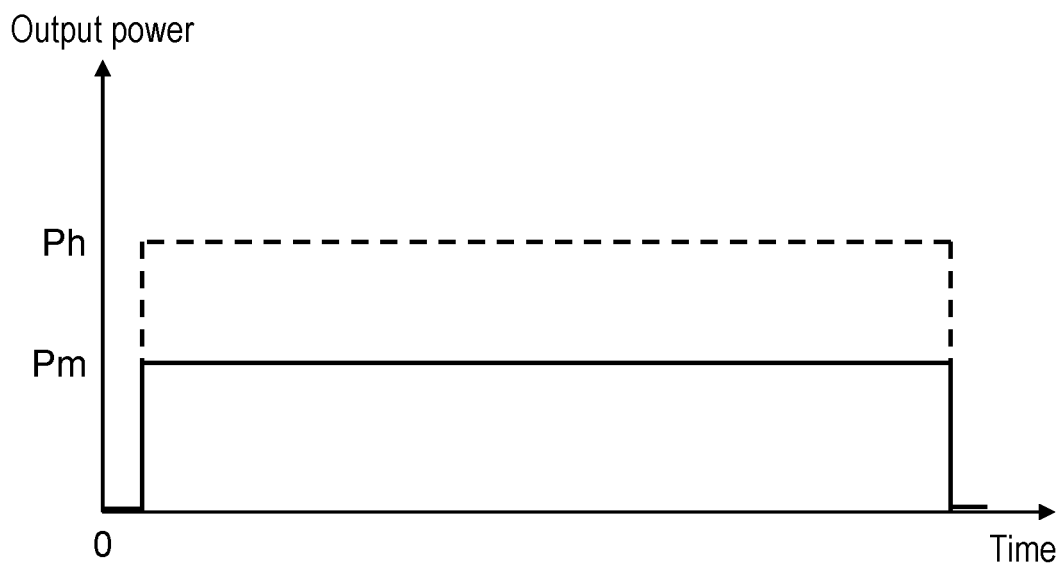
FIG. 2A is a view showing a temporal change in output power of microwaves in accordance with the first exemplary embodiment.
Figure 2B:
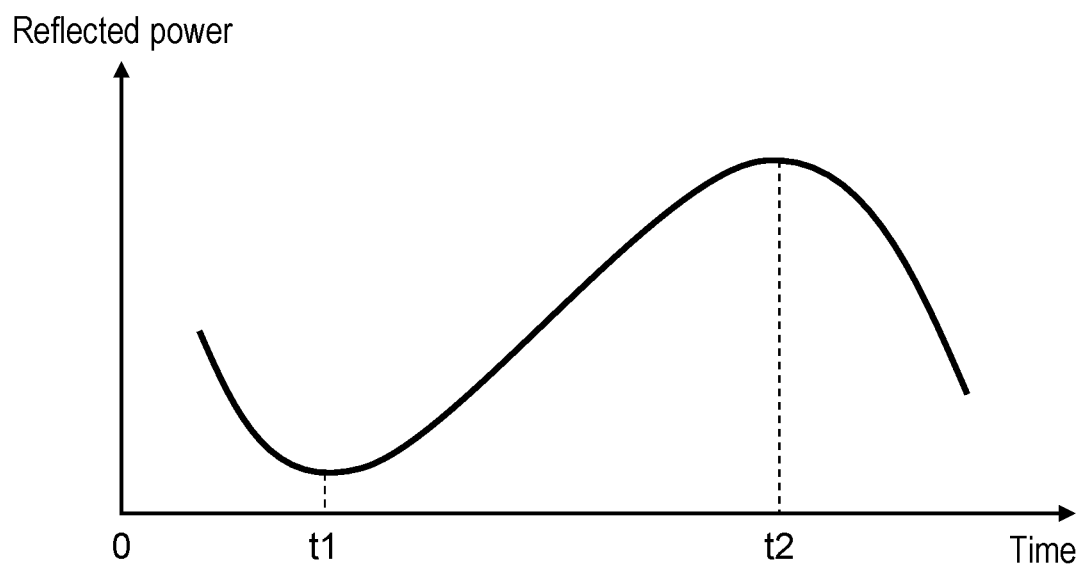
FIG. 2B is a view showing a temporal change in reflected power in accordance with the first exemplary embodiment.

FIG. 2A shows a temporal change in output power of microwaves in accordance with this exemplary embodiment. FIG. 2B shows a temporal change in reflected power in accordance with this exemplary embodiment.

In general, as the output power of the microwaves emitted from power feeder 4, that is, the incident power is larger, the reflected power becomes larger. In this exemplary embodiment, the output power of the microwaves is set such that the reflected power falls within a range detectable by detector 5.

As shown in FIG. 2A, the output power Pm of a microwave is set to be smaller than the output power Ph of heater 7 such that heating target 2 is heated mainly by heater 7.

In the example shown in FIG. 2A, microwaves are successively supplied from power feeder 4. FIG. 2B shows a temporal change in reflected power in the case of incident power at an arbitrary frequency. Power absorbed by heating target 2 and resonance patterns inside heating chamber 1 change for each frequency.

For example, as cooking proceeds, the temperature and moisture content of heating target 2 change, and the power absorbed by heating target 2 changes. When heating chamber 1 is filled with vapor from heating target 2, the dielectric constant in heating chamber 1 changes, and the resonance pattern also changes. The reflected power also changes in accordance with the change of power consumed in heating chamber 1. The progress of cooking can be understood by detecting the local minimum value (time t1 in FIG. 2B) and the local maximum value (time t2 in FIG. 2B) in the temporal change of the reflected power with the proceeding of cooking.

In general, when a packet lunch, bread, a prepared food, or the like, sold in a supermarket, a convenience store, or the like, is heated by a microwave treatment device such as a microwave oven, the output power of the microwave is set to 500 W or 600 W. In other words, in order to sufficiently heat heating target 2, at least 500 W of the output power is required.

Therefore, in this exemplary embodiment, controller 6 sets the output power of the microwaves supplied by heater 7 at the time of heating at less than 500 W on average per predetermined time so that the microwaves supplied to heating chamber 1 does not contribute to the heating of heating target 2.

When the microwave heating is used in combination with radiant heating or convection heating, a cooking sequence by the radiant heating or the convection heating needs to be changed to a cooking sequence including microwave heating. However, in this exemplary embodiment, controller 6 sets the output power of microwaves so that the reflected power falls within a range detectable by detector 5. Thus, the labor of changing the cooking sequence can be saved.

Second Exemplary Embodiment

Figure 3A:
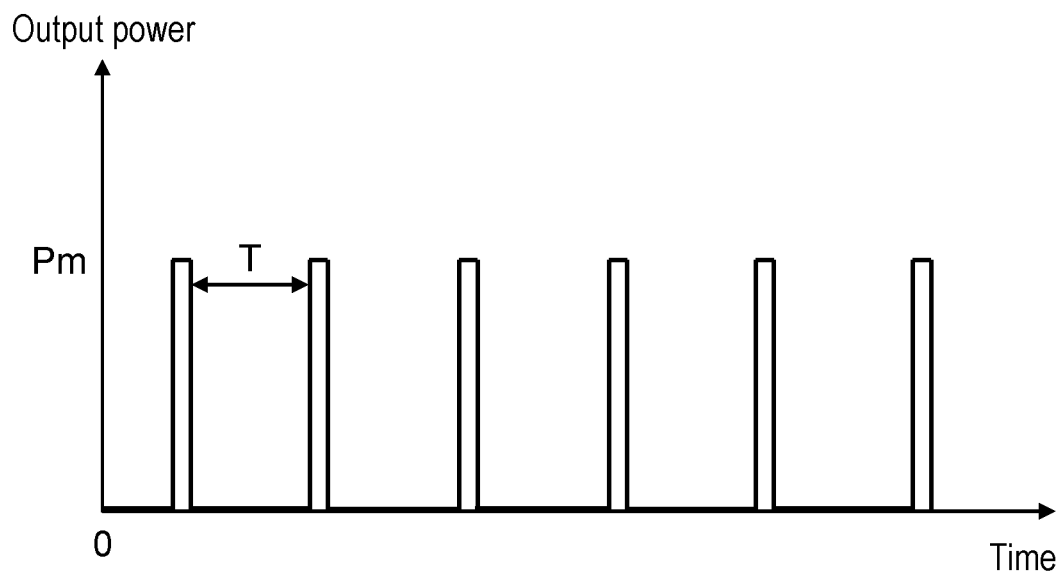
FIG. 3A is a view showing an example of a temporal change in output power of microwaves in accordance with a second exemplary embodiment.
Figure 3B:
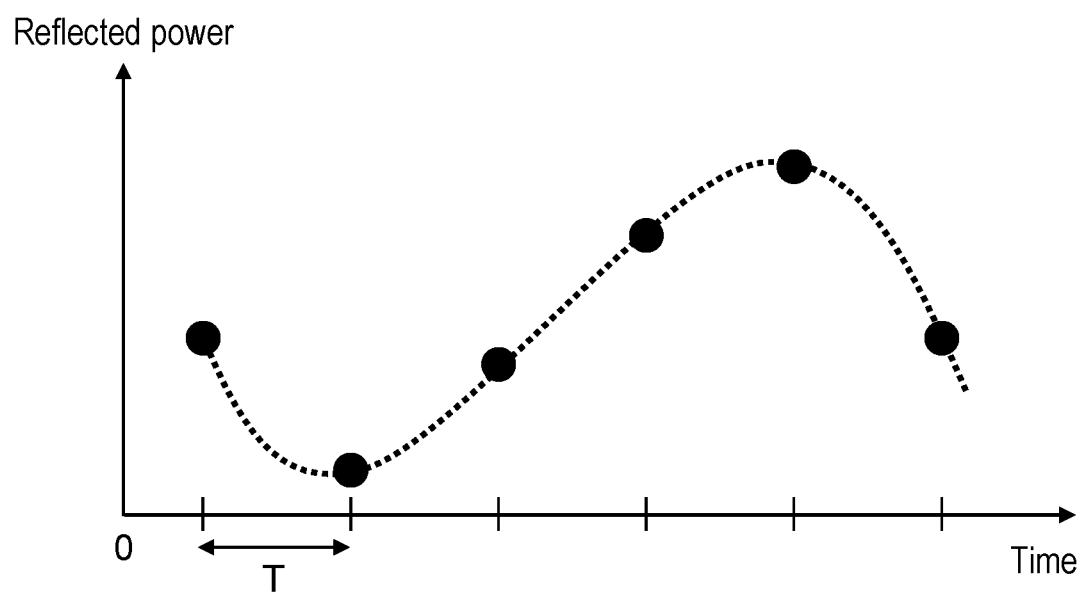
FIG. 3B is a view showing an example of a temporal change in reflected power in accordance with the second exemplary embodiment.

A microwave treatment device in accordance with a second exemplary embodiment of the present disclosure is described with reference to FIGS. 3A to 4B. FIG. 3A shows an example of a temporal change in output power of microwaves in this exemplary embodiment. FIG. 3B shows an example of a temporal change in reflected power in the microwave treatment device in accordance with this exemplary embodiment. The microwave treatment device in accordance with this exemplary embodiment has the same configuration as in the first exemplary embodiment shown in FIG. 1.

As shown in FIG. 3A, in this exemplary embodiment, in order to make the output power of microwaves be less than 500 W on average per 10 seconds controller 6 causes microwave generator 3 to generate microwaves intermittently. For example, controller 6 allows microwave generator 3 to repeat a sequence of generating microwaves at 900 W of output power for five seconds, and then stopping generating the microwaves for five seconds.

Depending on the performance of detector 5, a change of the reflected power may not be able to be sufficiently detected. In such a case, in order that the level of the detected reflected power is increased, controller 6 causes microwave generator 3 to increase the output power of the intermittently supplied microwaves.

When the microwaves are supplied at a predetermined time interval, the reflected power is also detected at the same time interval as that of the supplying of the microwaves. Consequently, as shown in FIG. 3B, it is necessary to set the time interval of outputting of the microwaves such that the feature points in the temporal change of the reflected power can be captured.

Figure 4A:
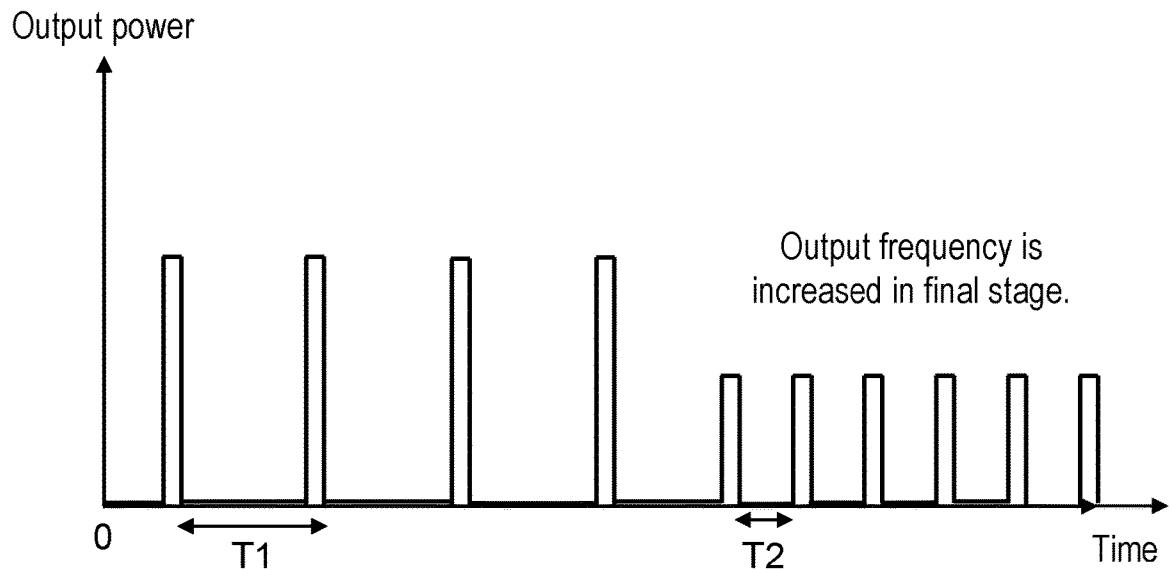
FIG. 4A is a view showing another example of a temporal change in output power of microwaves in accordance with the second exemplary embodiment.
Figure 4B:
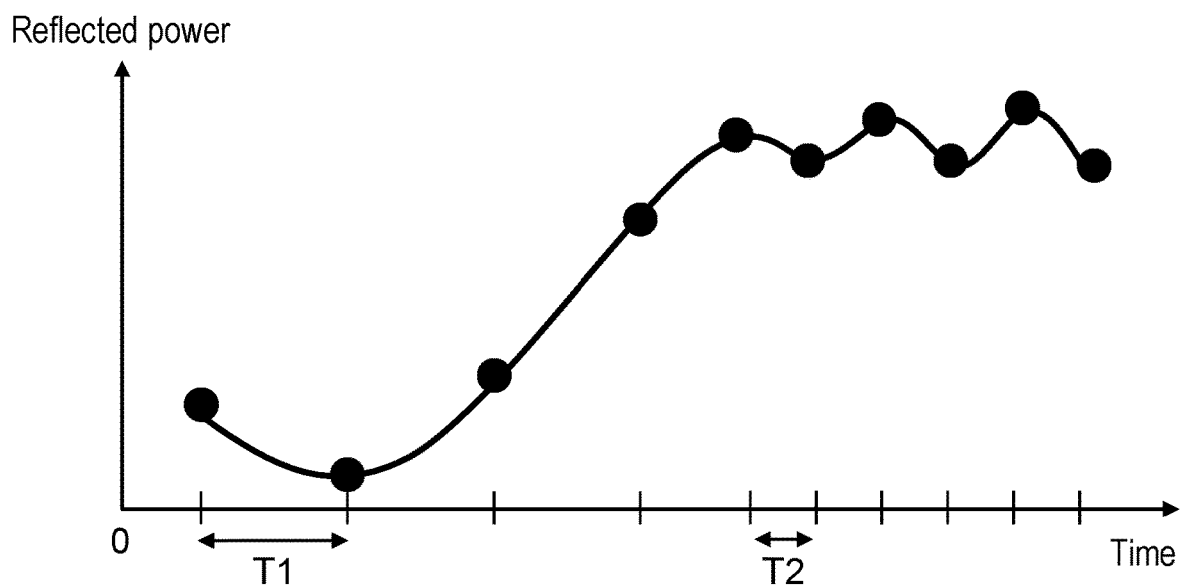
FIG. 4B is a view showing another example of a temporal change in reflected power in accordance with the second exemplary embodiment.

FIG. 4A shows another example of a temporal change in output power of microwaves in the microwave treatment device in accordance with this exemplary embodiment. FIG. 4B shows another example of a temporal change of reflected power in accordance with this exemplary embodiment.

Depending on cooking steps, power consumption in heating chamber 1 may be rapidly changed. In particular, in the final stage of cooking, steps such as cooking a food well and browning a food affect the finish quality of a dish. Therefore, it is necessary to accurately detect the reflected power. For detection with high accuracy, it is necessary to set the time interval of outputting of microwaves smaller, that is, to increase the output frequency of the microwaves.

As shown in FIG. 4A, the time interval T2 in the final stage of cooking is set to be smaller than time interval T1 in the initial stage of cooking. Thus, even when the reflected power is changed finely, the local maximum value and the local minimum value can be detected. Therefore, the microwave treatment device of this exemplary embodiment can finish the cooking by appropriately ascertaining the progress of cooking.

In this way, controller 6 may change the time interval of the intermittently supplied microwaves depending on the proceeding of cooking. In the example shown in FIG. 4A, the output power of the microwaves in the final stage of cooking is smaller than that in the initial stage of cooking. However, the output power of the microwave in the final stage of cooking may be set at the same value as the output power of the microwaves in the initial stage of cooking.

For example, when the temporal change of the reflected power is small or the reflected power continues to change monotonically in the middle of cooking, the output power of the microwaves and the output frequency are reduced. Thus, the effect of energy saving can also be expected.

Third Exemplary Embodiment

Figure 5:
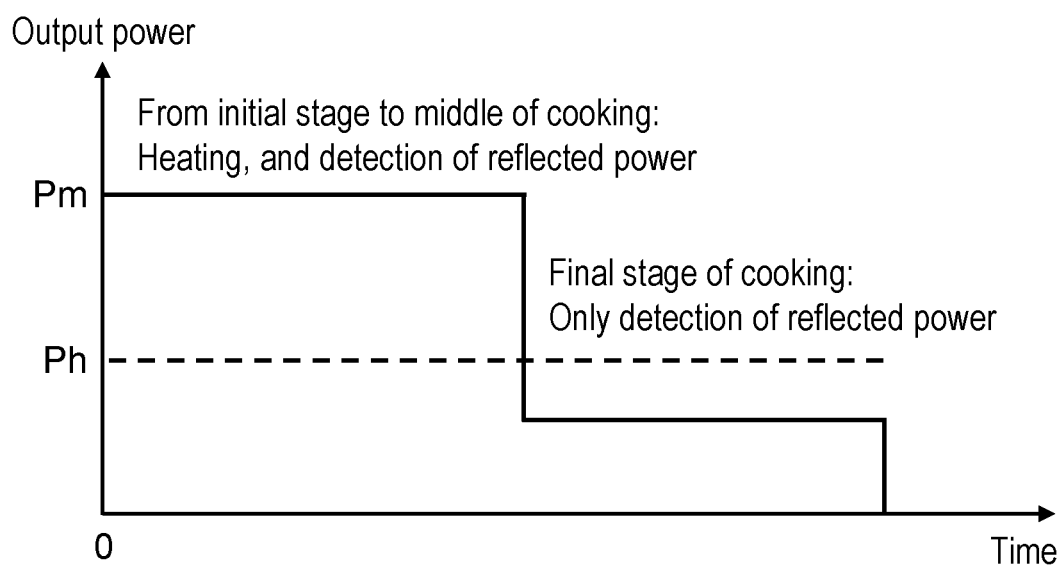
FIG. 5 is a view showing a temporal change in output power of microwaves in accordance with a third exemplary embodiment.

A microwave treatment device in accordance with a third exemplary embodiment of the present disclosure is described with reference to FIGS. 5 to 6B. FIG. 5 is a view showing a temporal change in output power of microwaves in accordance with this exemplary embodiment. The microwave treatment device in accordance with this exemplary embodiment has the same configuration as that in the first exemplary embodiment shown in FIG. 1.

Depending on the type and condition of heating target 2, microwave heating may effectively affect the finish of food. Therefore, in addition to understanding the progress of cooking with microwaves as in the first and second exemplary embodiments, microwave heating may be carried out simultaneously.

Foods for which microwave heating is effective include croissant, lasagna, and the like. Croissant dough is subjected to heating by heater 7, and to microwave heating in the initial stage of cooking. This increases bulk of the dough, and can uniformly heat the dough to its interior. As a result, improvement in the finish and shortening of time can be expected.

Specifically, in the initial stage of cooking, the output power of the microwaves is set to be larger than the output power of the microwaves in accordance with the first exemplary embodiment, and larger than the output power Ph of heater 7. The output power of the microwaves in accordance with the first exemplary embodiment is output power of less than 500 W on average per predetermined time. The microwave treatment device of this exemplary embodiment carries out microwave heating, and at the same time, understanding progress of cooking by detecting reflected power.

However, in a step of browning croissant in the final stage of cooking, there is a risk that the finish may deteriorate due to excessive evaporation of moisture by the microwave heating. Therefore, in the final stage of cooking, the output power of the microwaves is set at the output power in the first exemplary embodiment, and the output power of the microwaves is used preferably only for understanding the progress of cooking.

In this way, in this exemplary embodiment, controller 6 may cause microwave generator 3 to provide a time zone in which the output power of the microwaves is set to be larger than the predetermined output power in the first exemplary embodiment.

Flow of Cooking Control and Detection Processing of Reflected Power

Depending on cooking menu, instead of continuing the same output power from the start to the end of cooking, it is necessary to change the output power and shift the cooking steps depending on the progress of cooking of heating target 2.

For example, when roast chicken is cooked by using heater 7, firstly, the temperature in heating chamber 1 is raised to, for example, 200° C. to grill the surface of heating target 2. Then, the temperature in heating chamber 1 is lowered to, for example, 170° C. to heat heating target 2 to its interior. In such a case, it is useful to understand the progress of cooking based on the detection result of the reflected power, and to determine whether or not to shift the cooking step.

Figure 6A:
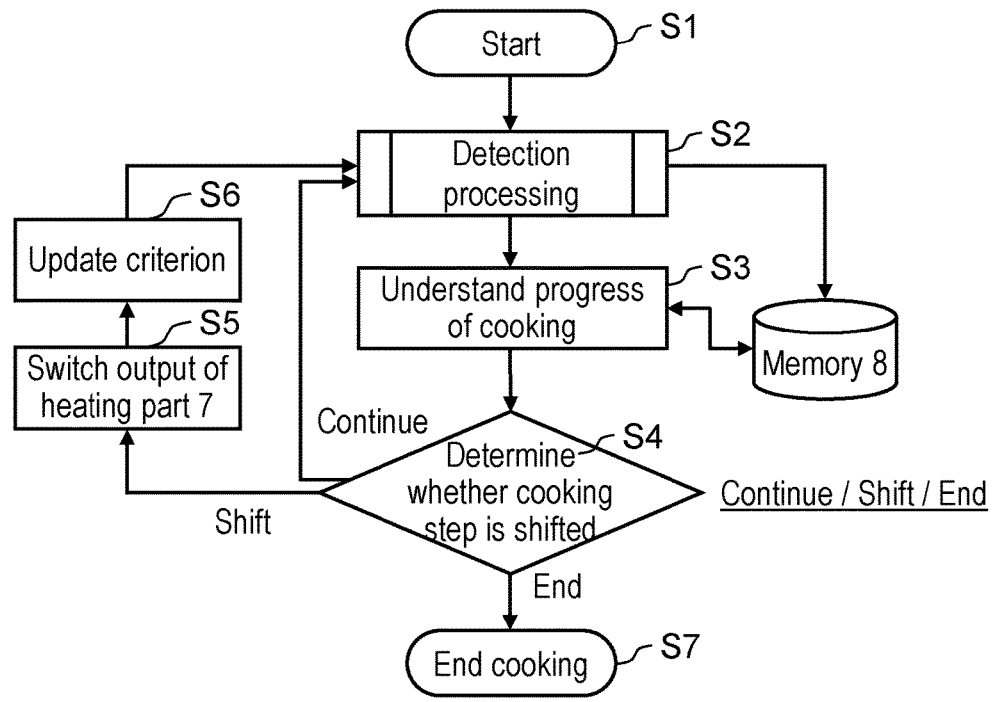
FIG. 6A is a flow chart showing a flow of cooking control in accordance with the third exemplary embodiment.

FIG. 6A is a flow chart showing a flow of cooking control by the microwave treatment device of this exemplary embodiment. When a user instructs the microwave treatment device to start cooking (step S1), controller 6 starts heating by heater 7, and then performs detection processing (step S2).

Figure 6B:
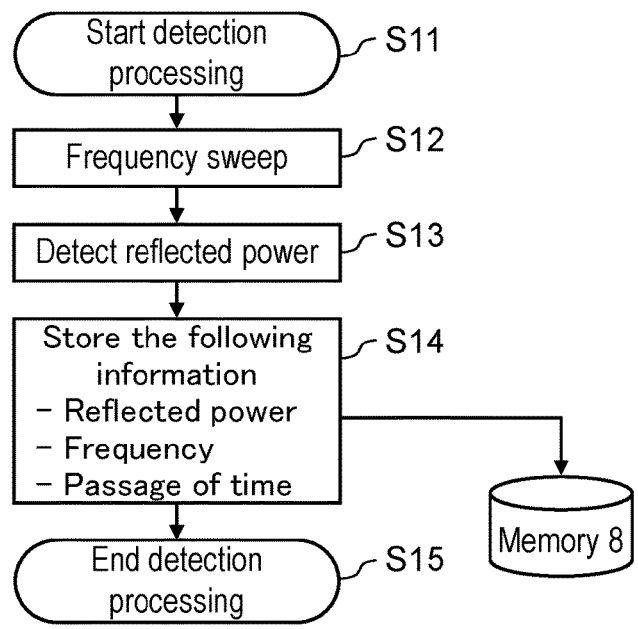
FIG. 6B is a flow chart showing the details of detection processing of reflected power in accordance with the third exemplary embodiment.

FIG. 6B is a flow chart showing the details of the detection processing (step S2). When the detection processing is started (step S11), microwave generator 3 generates microwaves while sequentially changing the frequency at a predetermined interval in a predetermined frequency band (for example, 2.40 GHz to 2.50 GHz) (step S12). Hereinafter, an operation of sequentially changing a frequency at a predetermined interval over a predetermined frequency band refers to as a frequency sweep.

Microwave generator 3 generates microwaves while carrying out the frequency sweep. Detector 5 detects reflected power every frequency. Thus, controller 6 measures the frequency characteristic of the reflected power, and determines the frequencies of the local minimum point, the local maximum point, the maximum point, and the minimum point in the frequency characteristic (step S13). Controller 6 stores in memory 8 an amount of the reflected power obtained in step S13, frequencies at the local minimum point, the local maximum point, the maximum point, and the minimum point, and passage of time from the start of heating (step S14), and completes the detection processing (step S15).

The processing returns to FIG. 6A, and controller 6 understands the progress of cooking based on a change over time of the obtained information (step S3). Controller 6 determines whether the cooking step is shifted based on the progress of cooking (step S4). When the determination result is "Continue" (step S2), controller 6 returns the processing to the detection processing.

When the determination result is "Shift", controller 6 switches the output of heater 7 (step S5). Output switching of heater 7 includes change of output power of heater 7, and change of the heat source from heater 7 to microwave generator 3. Controller 6 updates the criterion for shifting to the next cooking step (step S6), and returns the processing to the detection processing (step S2). When the determination result in step S4 is "End," controller 6 ends cooking (step S7).

As mentioned above, in this exemplary embodiment, one power feeder 4 is disposed. However, a plurality of power feeders 4 may be disposed. In this exemplary embodiment, microwave generator 3 includes an oscillator made of a semiconductor. However, microwave generator 3 may include other oscillator such as magnetron.

INDUSTRIAL APPLICABILITY

As mentioned above, the microwave treatment device of the present disclosure is applicable to microwave heating devices for industrial use, for example, drying devices, heating devices for ceramics, kitchen garbage processors, semiconductor manufacturing devices, chemical reaction devices, and the like, in addition to cooking devices for dielectrically heating foods.

REFERENCE MARKS IN THE DRAWINGS 1 heating chamber
2 heating target
3 microwave generator
4 power feeder
5 detector
6 controller
7 heater
8 memory

The invention claimed is:

1. A microwave treatment device comprising:
    a heating chamber configured to accommodate a heating target;
    a microwave generator configured to generate microwaves;
    a heater including a heat source other than the microwaves and configured to heat an inside of the heating chamber;
    a power feeder configured to supply the heating chamber with the microwaves;
    a detector configured to detect reflected power from the power feeder; and
    a controller configured to control output power of the heater and output power of the microwave generator,
    wherein the controller is configured to cause the microwave generator to generate the microwaves in heating by the heater, the microwaves having output power such that the reflected power at a level detectable by the detector returns,
    wherein the controller is configured to cause the microwave generator to provide a time zone in which the output power of the microwaves is set to be larger than the output power such that the reflected power at the level detectable by the detector returns, and
    wherein the controller is configured to control the output power of the heater based on the reflected power detected by the detector when the output power of the microwaves is the output power such that the reflected power at the level detectable by the detector returns.

2. The microwave treatment device according to claim 1, wherein the controller is configured to cause the microwave generator to set the output power of the microwave to a predetermined output power smaller than the output power of the heater.

3. The microwave treatment device according to claim 1, wherein the controller is configured to cause the microwave generator to set the output power of the microwaves to be less than 500 W on average per predetermined time.

4. The microwave treatment device according to claim 1, wherein the controller is configured to cause the microwave generator to generate the microwaves successively.

5. The microwave treatment device according to claim 1, wherein the controller is configured to cause the microwave generator to generate the microwaves intermittently.

6. The microwave treatment device according to claim 5, wherein the controller is configured to cause the microwave generator to change a time interval of the microwaves supplied intermittently in accordance with proceeding of cooking.

7. The microwave treatment device according to claim 2, wherein the controller is configured to cause the microwave generator to provide a time zone in which the output power of the microwave is set to be larger than the predetermined output power.

* * * * *